US010688949B2

(12) United States Patent
Okamura

(10) Patent No.: US 10,688,949 B2
(45) Date of Patent: Jun. 23, 2020

(54) OCCUPANT PROTECTION DEVICE

(71) Applicant: HONDA MOTOR CO., LTD., Tokyo (JP)

(72) Inventor: Kenyu Okamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 172 days.

(21) Appl. No.: 15/787,038

(22) Filed: Oct. 18, 2017

(65) Prior Publication Data
US 2018/0111574 A1 Apr. 26, 2018

(30) Foreign Application Priority Data
Oct. 20, 2016 (JP) .................. 2016-205874

(51) Int. Cl.
*B60R 21/0132* (2006.01)
*B60R 21/01* (2006.01)

(52) U.S. Cl.
CPC .. *B60R 21/0132* (2013.01); *B60R 2021/0104* (2013.01); *B60R 2021/01325* (2013.01); *B60R 2021/01327* (2013.01)

(58) Field of Classification Search
CPC ...... B60R 21/0132; B60R 2021/01325; B60R 2021/01327
See application file for complete search history.

(56) References Cited

U.S. PATENT DOCUMENTS

| 7,017,700 | B2* | 3/2006 | Frimberger ........... B60R 21/013 180/282 |
| 7,272,480 | B2* | 9/2007 | Mattes ................ B60R 21/0132 180/268 |
| 9,371,051 | B2* | 6/2016 | Shimizu .............. B60R 21/0136 |
| 9,598,075 | B2* | 3/2017 | Makino .............. B60W 10/184 |
| 10,059,207 | B2* | 8/2018 | Thoemmes ........... B60K 28/14 |
| 2007/0043494 | A1 | 2/2007 | Kawasoe et al. |
| 2013/0124035 | A1 | 5/2013 | Doerr et al. |

(Continued)

FOREIGN PATENT DOCUMENTS

| CN | 100458447 C | 2/2009 |
| CN | 101641242 A | 2/2010 |

(Continued)

OTHER PUBLICATIONS

Office Action dated Jul. 31, 2019, issued in counterpart CN Application No. 201710854886.X (3 pages).

(Continued)

*Primary Examiner* — Faye M Fleming
(74) *Attorney, Agent, or Firm* — Westerman, Hattori, Daniels & Adrian, LLP

(57) ABSTRACT

An occupant protection device capable of protecting occupants at a higher level is provided. An occupant protection device comprises a first sensor for detecting a value concerning a rotation angle of a vehicle, a second sensor for detecting an acceleration in the vehicle longitudinal direction, and a collision determination section adapted to determinate whether or not a collision has occurred to the vehicle based on the detection result of the first sensor and to determinate whether or not the collision has occurred to the vehicle also based on the detection result of the second sensor.

17 Claims, 7 Drawing Sheets

(56) References Cited

U.S. PATENT DOCUMENTS

| | | | |
|---|---|---|---|
| 2013/0289859 A1* | 10/2013 | Kim | G08G 1/0112 |
| | | | 701/117 |
| 2013/0320654 A1 | 12/2013 | Clark et al. | |
| 2017/0320437 A1* | 11/2017 | Liebau | G01S 17/023 |
| 2018/0043889 A1* | 2/2018 | Eisele | B60W 30/08 |
| 2018/0190044 A1* | 7/2018 | Cappozza | B60R 19/483 |
| 2018/0268702 A1* | 9/2018 | Morotomi | G08G 1/166 |

FOREIGN PATENT DOCUMENTS

| | | | | |
|---|---|---|---|---|
| CN | 102245441 A | 11/2011 | | |
| CN | 102529860 A | 7/2012 | | |
| CN | 102806881 A | 12/2012 | | |
| CN | 103380028 A | 10/2013 | | |
| CN | 106004880 A | 10/2016 | | |
| JP | 9-118195 A | 5/1997 | | |
| JP | 11-208413 A | 8/1999 | | |
| JP | 2002-316629 A | 10/2002 | | |
| JP | 2004-177289 A | 6/2004 | | |
| JP | 2004-217178 A | 8/2004 | | |
| JP | 2005-280380 A | 10/2005 | | |
| JP | 2006-298008 A | 11/2006 | | |
| JP | 2008-65541 A | 3/2008 | | |
| JP | 2009-96297 A | 5/2009 | | |
| JP | 2010-506794 A | 3/2010 | | |
| JP | 2013-154838 A | 8/2013 | | |
| JP | 2013-199150 A | 10/2013 | | |
| JP | 2014-137733 A | 7/2014 | | |
| JP | 2015-178325 A | 10/2015 | | |
| JP | 2015223956 A | 12/2015 | | |
| JP | 2015223956 A | * | 12/2015 | ......... B60R 21/0132 |
| JP | 2016043860 A | 4/2016 | | |

OTHER PUBLICATIONS

Search Report dated Jul. 23, 2019, issued in counterpart CN Application No. 201710854886.X (3 pages).

Office Action dated Sep. 17, 2019, issued in counterpart JP Application No. 2016-205874, with English translation (10 pages).

* cited by examiner

OCCUPANT PROTECTION DEVICE

CROSS REFERENCES TO RELATED APPLICATIONS

The present application claims priority under 35 U.S.C. § 119 to Japanese Patent Application No. 2016-205874, filed Oct. 20, 2016, entitled "Occupant Protection Device." The contents of this application are incorporated herein by reference in their entirety.

TECHNICAL FIELD

The present disclosure relates to an occupant protection device.

BACKGROUND

As one of the occupant protection devices adapted to protect occupants at the time of collision, an airbag system is known. As a collision determination device for such an occupant protection device, a collision determination device is proposed to perform a collision determination by integrating data from pressure sensors and impact sensors which are provided in various parts of a vehicle (e.g., refer to Japanese Published Unexamined Application No. 2013-159150).

SUMMARY

Incidentally, it is preferable that an occupant protection device protect occupants at a higher level.

The present disclosure was made in view of this. It is preferable to provide an occupant protection device which can protect occupants at a higher level.

In the first aspect of embodiments, an occupant protection device (e.g., an occupant protection device 1 of the present embodiment) comprises a first sensor (e.g., a yaw rate sensor 28c of the present embodiment) for detecting a value concerning a rotation angle of a vehicle (e.g., a vehicle M of the present embodiment), a second sensor (e.g., a first side sensor 21 of the present embodiment or an X-direction acceleration sensor 21b of the first side sensor 21) provided on a side of the vehicle (e.g., a side S1 of the present embodiment) to detect an acceleration in the vehicle longitudinal direction, and a collision determination section (e.g., a collision determination section 12 of the present embodiment) adapted to determine whether or not a collision has occurred to the vehicle based on the detection result of the first sensor and to determine whether or not the collision has occurred to the vehicle also based on the detection result of the second sensor.

In the second aspect, the collision determination section determines whether or not the collision has occurred to the vehicle based on a value showing a rotation behavior of the vehicle obtained from the detection result of the first sensor and determines whether or not the collision has occurred to the vehicle also based on a value showing a rotation behavior of the vehicle obtained from the detection result of the second sensor.

In the third aspect, the collision determination section determines whether or not the collision has occurred to the vehicle based on the detection result of the first sensor for a collision at a first speed and determines whether or not the collision has occurred to the vehicle based on the detection result of the second sensor for a collision at a second speed faster than the first speed.

In the fourth aspect, the collision determination section determines that the collision has occurred to the vehicle in the case where a value based on the detection result of the first-sensor exceeds a first threshold value and determines that the collision has occurred to the vehicle even in the case where a value based on the detection result of the second sensor exceeds a second threshold value, wherein the first threshold value is provided in such a manner that, in the case where a collision at a first speed has occurred to the vehicle, a value based on the detection result of the first sensor is set to a value exceeding the first threshold value, while the second threshold value is provided in such a manner that, in the case where the collision at a first speed has occurred to the vehicle, a value based on the detection result of the second sensor is set to a value which does not exceed the second threshold value and, in the case where the collision at a second speed faster than the first speed has occurred to the vehicle, a value based on the detection result of the second sensor is set to a value exceeding the second threshold value.

In the fifth aspect, the second sensor detects the acceleration in the vehicle width direction and the collision determination section determines whether or not the collision has occurred to the vehicle based on the detection result of the first sensor and the detection result concerning the acceleration of the second sensor in the vehicle width direction and determines whether or not the collision has occurred to the vehicle also based on the detection result concerning the acceleration of the second sensor in the vehicle longitudinal direction and the detection result concerning the acceleration of the second sensor in the vehicle width direction.

In the sixth aspect, the occupant protection device is also provided with a third sensor (e.g., a Y-direction acceleration sensor 21a of the present embodiment) for detecting the acceleration in the vehicle width direction, wherein the collision determination section determines whether or not the collision has occurred to the vehicle based on the detection result of the first sensor and the detection result of the third sensor and determines whether or not the collision has occurred to the vehicle also based on the detection result of the second sensor and the detection result of the third sensor.

In the seventh aspect, the collision determination section determines that the collision has occurred to the vehicle in the case where a value based on the detection result of the first sensor exceeds a first threshold value and a value based on the detection result concerning the acceleration in the vehicle width direction exceeds a third threshold value and determines that the collision has occurred to the vehicle even in the case where a value based on the detection result concerning the acceleration of the second sensor in the vehicle longitudinal direction exceeds a second threshold value and a value based on the detection result concerning the acceleration in the vehicle width direction exceeds a third threshold value.

In the eighth aspect, the occupant protection device is also provided with a protection member control section (e.g., an airbag control section 13 of the present embodiment) for determining an operation method of an occupant protection member (e.g., a first side airbag 31 of the present embodiment) based on the detection result of the first sensor or the detection result concerning the acceleration of the second sensor in the vehicle longitudinal direction and the detection result concerning the acceleration in the vehicle width direction.

In the ninth aspect, the collision determination section determines a collision position in the vehicle based on the detection result of the first sensor or the detection result-concerning the acceleration of the second sensor in the vehicle longitudinal direction and the detection result concerning the acceleration in the vehicle width direction.

In the tenth aspect, the collision determination section determines a collision speed to the vehicle based on the detection result of the first sensor or the detection result concerning the acceleration of the second sensor in the vehicle longitudinal direction and the detection result concerning the acceleration in the vehicle width direction.

According to the first aspect, since it is determined whether or not the collision has occurred to the vehicle based on the detection result of the first sensor and it is determined whether or not the collision has occurred to the vehicle also based on the detection result of the second sensor, for example, in the case where the collision at a low speed has occurred to the vehicle, it is possible to determine the collision based on the detection result of the sensor concerning a rotation angle of a vehicle of which the stability is high and, for example, in the case where the collision at a high speed has occurred to the vehicle, it is possible to determine the collision based on the detection result of the sensor concerning the acceleration with highly prompt reporting feature. With this, it is possible to satisfy both the highly prompt reporting feature and the stability of the collision determination and to protect occupants at a higher level.

According to the second aspect, it is determined whether or not the collision has occurred to the vehicle based on a value showing a rotation behavior of the vehicle obtained from the detection result of the first sensor and it is determined whether or not the collision has occurred to the vehicle also based on a value showing the rotation behavior of the vehicle obtained from the detection result of the second sensor. As a result, the accuracy of collision determination can be improved to protect the occupants at a higher level.

According to the third aspect, for the collision at a first speed, it is determined whether or not the collision has occurred to the vehicle based on the detection result of the first sensor and, for the collision at a second speed faster than the first speed, it is determined whether or not the collision has occurred to the vehicle based on the detection result of the second sensor. Accordingly, for a low speed collision, it is possible to determine the collision based on the detection result of the sensor concerning the rotation angle of the vehicle of which the stability is high. On the other hand, for a high speed collision, it is possible to determine the collision based on the detection result of the sensor concerning the acceleration with highly prompt reporting feature. With this, the occupants can be protected at a higher level.

According to the fourth aspect, the collision determination section determines that the collision has occurred to the vehicle in the case where a value based on the detection result of the first sensor exceeds a first threshold value and determines that the collision has occurred to the vehicle even in the case where a value based on the detection result of the second sensor exceeds a second threshold value, wherein the first threshold value is provided in such a manner that, in the case where the collision at the first speed has occurred to the vehicle, the value based on the detection result of the first sensor is set to a value exceeding the first threshold value, while the second threshold value is provided in such a manner that, in the case where the collision at the first speed has occurred to the vehicle, the value based on the detection result of the second sensor is set to a value which does not exceed the second threshold value and, in the case where the collision at a second speed faster than the first speed has occurred to the vehicle, the value based on the detection result of the second sensor is set to a value exceeding the second threshold value. In this way, it is possible to control suppress a false detection caused by noise inputted to the second sensor, thereby improving the accuracy of collision determination.

According to the fifth and sixth aspects, the occupant protection device is provided in such a manner that the collision determination section determines whether or not the collision has occurred to the vehicle based on the detection result of the first sensor and the detection result concerning the acceleration in the vehicle width direction and determines whether or not the collision has occurred to the vehicle also based on the detection result concerning the acceleration of the second sensor in the vehicle longitudinal direction and the detection result concerning the acceleration in the vehicle width direction. As a result, it is possible to suppress a false detection caused by noise inputted to the first and second sensors, thereby improving the accuracy of collision determination.

According to the seventh aspect, since it is determined that the collision has occurred to the vehicle in the case where a value based on the detection result of the first sensor exceeds the first threshold value and a value based on the detection result concerning the acceleration in the vehicle width direction exceeds a third threshold value and it is determined that the collision has occurred to the vehicle even in the case where a value based on the detection result concerning the acceleration of the second sensor in the vehicle longitudinal direction exceeds the second threshold value and a value based on the detection result concerning the acceleration in the vehicle width direction exceeds a third threshold value, it is possible to determine both the low and high speed collisions more certainly.

According to the eighth aspect, since an operation method of an occupant protection member is determined based on the detection result of the first sensor or the detection result concerning the acceleration of the second sensor in the vehicle longitudinal direction and the detection result concerning the acceleration in the vehicle width direction, occupants can be protected at a higher level.

According to the ninth aspect, since a collision position in the vehicle is determined based on the detection result of the first sensor or the detection result concerning the acceleration of the second sensor in the vehicle longitudinal direction and the detection result concerning the acceleration in the vehicle width direction, occupants can be protected at a higher level by effectively performing the operation of the occupant protection member and the emergency call.

According to the tenth aspect, since the collision speed to the vehicle is determined based on the detection result of the first sensor or the detection result concerning the acceleration of the second sensor in the vehicle longitudinal direction and the detection result concerning the acceleration in the vehicle width direction, occupants and their surroundings can be protected at a higher level by effectively performing the operation of the occupant protection member and the emergency call. In the above explanation of the exemplary embodiment, specific elements with their reference numerals are indicated by using brackets. These specific elements are presented as mere examples in order to facilitate understanding, and thus, should not be interpreted as any limitation to the accompanying claims.

DETAILED DESCRIPTION

Figure 1:
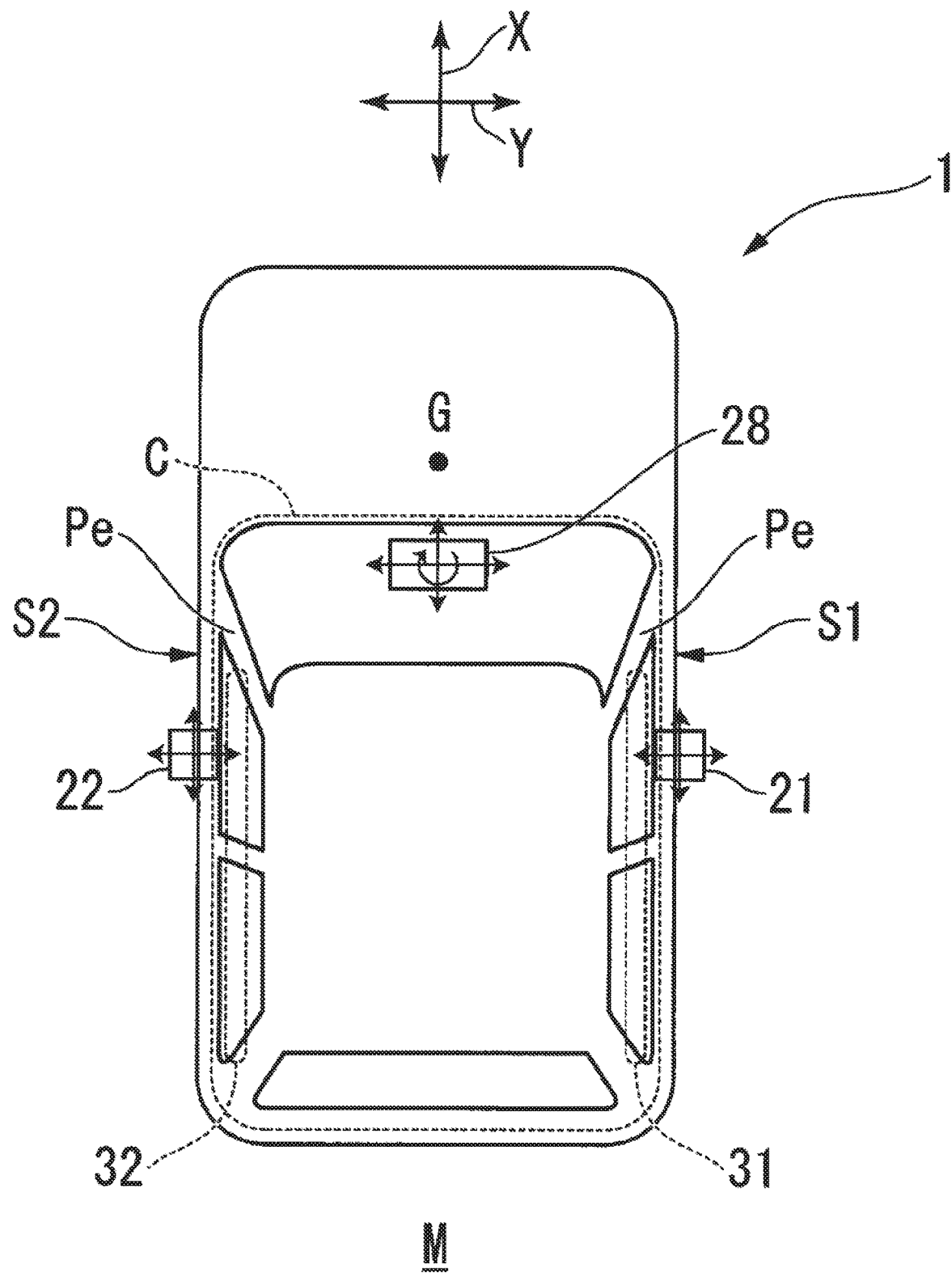
FIG. 1 is a plan view showing a vehicle provided with an occupant protection device of the present embodiment.

A preferred embodiment of the present disclosure will now be described hereunder with reference to the accompanying drawings. In the following description, the same reference numeral is given to a structure having substantially the same or similar function. And, those overlapping descriptions may be omitted. It is to be noted that the term "based on ○○" used in this application means "based on at least ○○" and also includes a case based on the other element in addition to ○○. Further, the term "based on" is not limited to a case where ○○ is directly used, but also includes a case based on that an operation or processing is carried out to ○○.

FIG. 1 is a plan view showing a vehicle M which is provided with an occupant protection device 1 of a first embodiment.

The occupant protection device 1 is a protection device for protecting occupants from a side collision, for example, to the vehicle M and includes an airbag system adapted to operates, for example, on the side of a seat.

Figure 2:
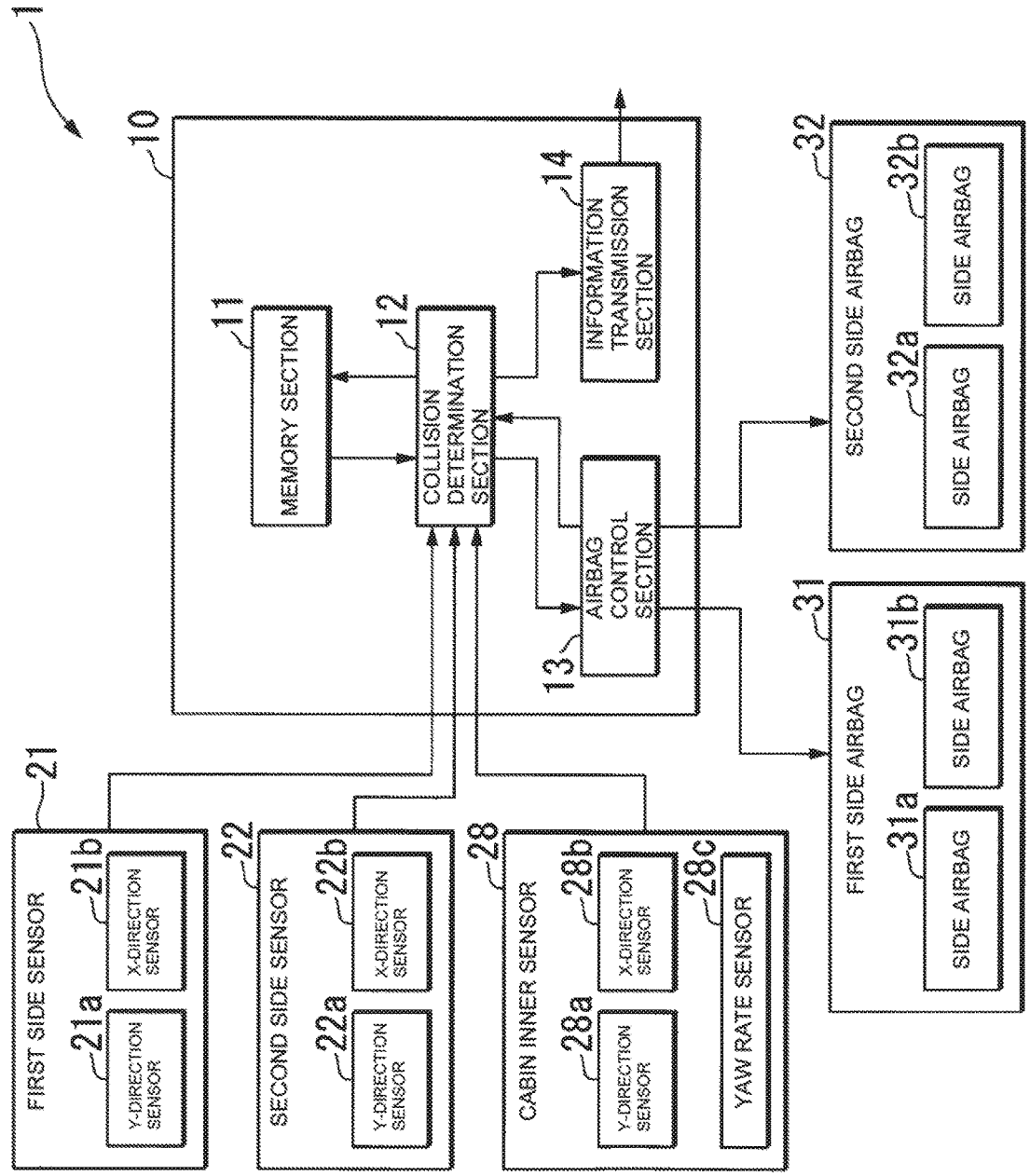
FIG. 2 is a block diagram showing the system configuration of the occupant protection device of the present embodiment.

As shown in FIG. 1, the occupant protection device 1 has a first side sensor 21, a second side sensor 22, a cabin inner sensor 28, a first side airbag 31, a second side airbag 32, and a control unit 10 (see FIG. 2).

The first side sensor 21 is provided on a first side S1 of the vehicle M in the vehicle width direction Y. The first side sensor 21 is one example of "a second sensor". The first side sensor 21 is, for example, a biaxial sensor and includes a Y-direction acceleration sensor 21a for detecting the acceleration of the vehicle width direction Y and an X-direction acceleration sensor 21b for detecting the acceleration of the vehicle longitudinal direction (the vehicle travel direction) X (see FIG. 2). The Y-direction acceleration sensor 21a is one example of "a third sensor" in a different point of view. The X-direction acceleration sensor 21b is one example of a "second sensor" in a different point of view. The first side sensor 21 outputs a value corresponding to the acceleration respectively applied to the Y-direction acceleration sensor 21a and the X-direction acceleration sensor 21b to the control unit 10 as a detection result. For example, the first side sensor 21 outputs the detection result to the control unit 10 at every predetermined time (e.g., every several hundred microseconds). Further, in the present embodiment, for convenience of explanation, the Y-direction acceleration sensor 21a is distinguished from the X-direction acceleration sensor 21b, but, for example, these are integrally formed with each other as one sensor element. Therefore, the term "the detection result of the Y-direction acceleration sensor 21a" in the following explanation can be replaced with "the detection result concerning the acceleration of the first side sensor 21 in the vehicle width direction Y". Likewise, the term "the detection result of the X-direction acceleration sensor 21b" can be replaced with "the detection result concerning the acceleration of the first side sensor 21 in the vehicle longitudinal direction X". Further, "the second sensor" and "the third sensor" may be provided as one sensor (one sensor part" as in the present embodiment, or may also be provided as two sensors disposed apart from each other. The first side sensor 21 is, for example, located apart from the lower end section (the base section) Pe of a front pillar relative to the gravity center G of the vehicle M. Still further, from the other point of view, the first side sensor 21 is located apart from the cabin inner sensor 28 relative to the gravity center G of the vehicle M.

The second side sensor 22 is provided on a second side S2 of the vehicle M in the vehicle width direction Y. The second side sensor 22 is one example of "a second sensor". The second side S2 is the opposite side of the first side S1 in the vehicle M. The second side sensor 22 is, for example, a biaxial sensor and includes a Y-direction acceleration sensor 22a for detecting the acceleration in the vehicle width direction Y and an X-direction acceleration sensor 22b for detecting the acceleration in the vehicle longitudinal direction X. The Y-direction acceleration sensor 22a is another example of "a third sensor" in a different point of view. The X-direction acceleration sensor 22b is another example of "a second sensor" in the different point of view. The second side sensor 22 outputs a value corresponding to the acceleration respectively applied to the Y-direction acceleration sensor 22a and the X-direction acceleration sensor 22b to the control unit 10 as a detection result. For example, the second side sensor 22 outputs the detection result to the control unit 10 at every predetermined time (e.g., every several hundred microseconds). Further, in the present embodiment, for convenience of explanation, the Y-direction acceleration sensor 22a is distinguished from the X-direction acceleration sensor 22b, but, for example, these are integrally formed with each other as one sensor element. Therefore, the term "the detection result of the Y-direction acceleration sensor 22a" can be replaced with "the detection result concerning the acceleration of the second side sensor 22 in the vehicle width direction Y". Likewise, the term "the detection result of the X-direction acceleration sensor 22b" can be replaced with "the detection result concerning the acceleration of the second side sensor 22 in the vehicle longitudinal direction X". The second side sensor 22 is, for example, located apart from the lower end section (the base section) Pe of the front pillar relative to the gravity center G of the vehicle M. Further, from the other point of view, the second side sensor 22 is located apart from the cabin inner sensor 28 relative to the gravity center G of the vehicle M.

The cabin inner sensor 28 is provided within a cabin C of the vehicle M. The cabin inner sensor 28 includes a Y-direction acceleration sensor 28a for detecting the acceleration in the vehicle width direction Y, an X-direction acceleration sensor 28b for detecting the acceleration in the vehicle longitudinal direction X, and a yaw rate sensor 28c for detecting a yaw rate of the vehicle M (see FIG. 2). The yaw rate sensor 28c detects the yaw rate (rotation angular speed) of the vehicle M relative to the rotation axis in the vertical direction as one example of a value concerning a rotation angle of the vehicle M. The yaw rate sensor 28c is one example of "a first sensor". The cabin inner sensor 28 of the present embodiment outputs a value corresponding to the acceleration applied to itself and a value corresponding to the yaw rate to the control unit 10 as a detection result. For example, the cabin inner sensor 28 outputs the detection result to the control unit 10 at every predetermined time (e.g., every several hundred microseconds).

The first side airbag 31 is provided on the first side S1 of the vehicle M. The first side airbag 31 includes at least one of a side airbag or a side-curtain airbag provided on the first side S1. For example, the first side airbag 31 includes a side airbag 31a provided corresponding to a front seat and a side airbag 31b provided according to a rear seat (see FIG. 2). Each of "the first side airbag 31", "the side airbag 31a", "the side airbag 31b", and "the side-curtain airbag" is one example of the "occupant protection member".

The second side airbag 32 is provided on the second side S2 of the vehicle M. The second side airbag 32 includes at least one of a side airbag or a side-curtain airbag provided on the second side S2. For example, the second side airbag 32 includes a side airbag 32a provided corresponding to a front seat and a side airbag 32b provided corresponding to a rear seat (see FIG. 2). Each of "the first side airbag 32", "the side airbag 32a", "the side airbag 32b", and "the side-curtain airbag" is one example of the "occupant protection member".

Next, the control unit 10 of the occupant protection device 1 will be described hereunder.

FIG. 2 is a block diagram showing the system configuration of the occupant protection device 1.

As shown in FIG. 2, the control unit 10 receives the detection result from the first side sensor 21, the second side sensor 22, and the cabin inner sensor 28 and controls the first side airbag 31 and the second side airbag 32. The control unit 10 is provided with a memory section 11, a collision determination section 12, an airbag control section 13, and an information transmission section 14.

The memory section 11 is formed by a storage device like a semiconductor memory. Various threshold values (described later) used in the collision determination and information concerning a virtual map are stored in the memory section 11.

The collision determination section 12 can access the memory section 11 to obtain information stored in the memory section 11. The collision determination section 12, for example, determines whether or not a collision (e.g. a side collision) has occurred to the vehicle M based on the detection result of the first side sensor 21, the detection result of the second side sensor 22, the detection result of the cabin inner sensor 28, and each threshold value acquired from the memory section 11. Further, in the case where the collision has occurred to the vehicle M, the collision determination section 12 determines the severity of collision and the like. A specific process of the collision determination section 12 will be described later. In the case where the collision determination section 12 determines that the collision has occurred to the vehicle M, the collision determination section 12 transmits the information showing the fact of an occurrence of collision, the severity of collision and the like to the airbag control section 13 and the information transmission section 14.

In the case where the collision determination section 12 determines that the collision has occurred to the vehicle M, the airbag control section 13 receives the information showing the fact of an occurrence of collision, the severity of collision and the like from the collision determination section 12. And, the airbag control section 13 transmits a control signal for deploying the airbag to the airbag (or the airbag corresponding to the collision position) at least on the side where the collision has occurred, of the first side airbag 31 and the second side airbag 32. With this, the airbag is deployed and the occupants can be protected. The airbag control section 13 is one example of "a protection member control section".

In the case where the collision determination section 12 determines that the collision has occurred to the vehicle M, the information transmission section 14 receives from the collision determination section 12 the information showing the fact of an occurrence of collision, the severity of collision and the like. And, the information transmission section 14 generates the information to be transmitted to the outside of the vehicle M as an emergency call (accident report, emergency report) and transmits that information.

Next, one example of a specific process of the collision determination section 12 will be described.

In the present embodiment, for easy understanding, an example in which the collision determination is performed based on the detection result of the sensor, on the side where the collision has occurred, of the first side sensor 21 and the second side sensor 22 and the detection result of the yaw rate sensor 28c will be described. Specifically, in the case where the collision has occurred to the first side S1 of the vehicle M, an example in which the collision determination is performed based on the detection result of the Y-direction acceleration sensor 21a and the X-direction acceleration sensor 21b of the first side sensor 21 and the detection result of the yaw rate sensor 28c will be described. Further, in the case where the collision has occurred to the second side S2 of the vehicle M, the same collision determination is performed as to the second side sensor 22.

Figure 3:
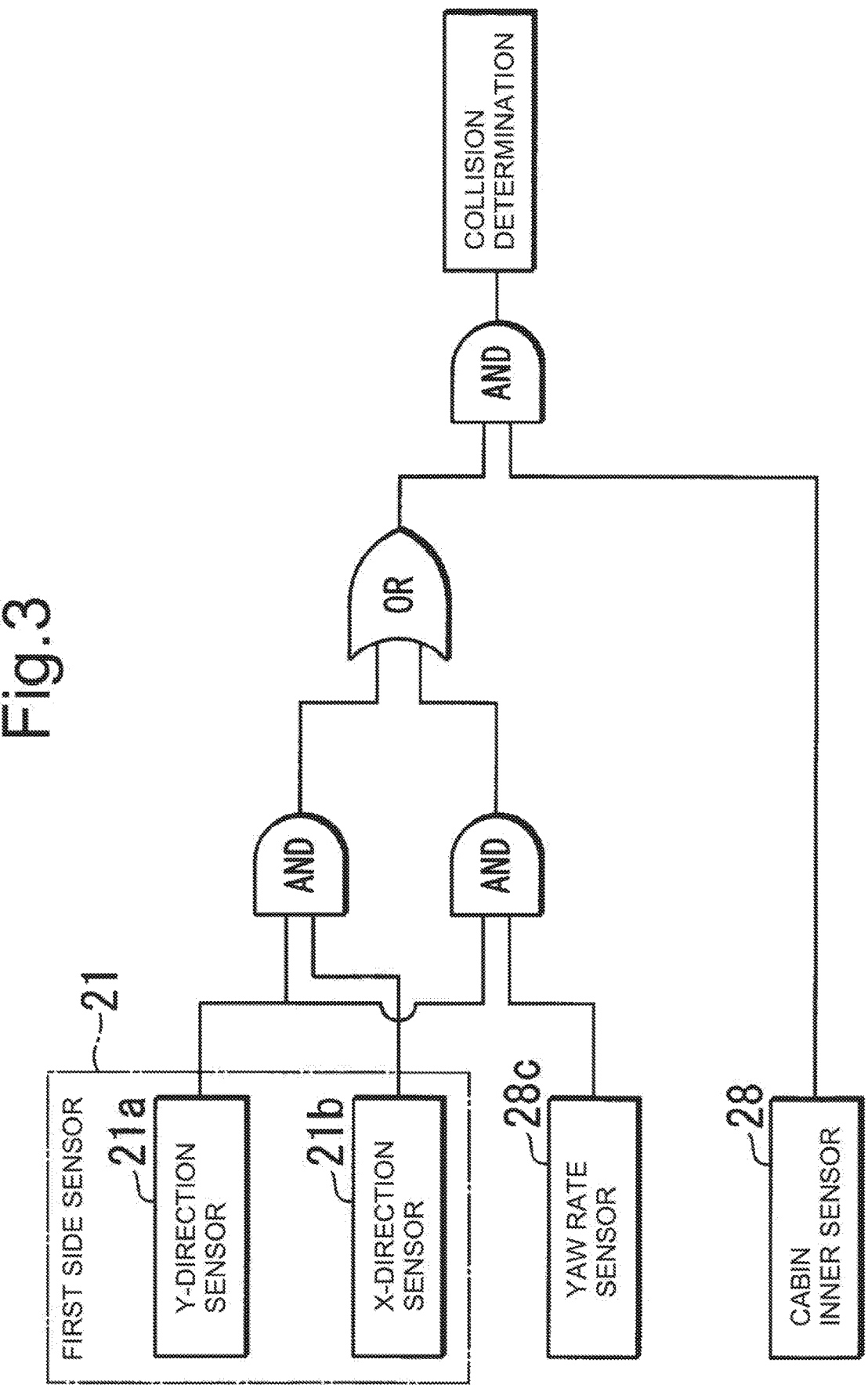
FIG. 3 is a view showing an algorithm for the collision determination of a collision determination section of the present embodiment.

FIG. 3 is a view showing an algorithm for collision determination of the collision determination section 12.

In the case where the collision has occurred to the vehicle M, the collision determination section 12 of the present embodiment determines whether or not the collision has occurred to the vehicle M based on a value showing a behavior of the vehicle M (a value based on the detection result of the yaw rate sensor 28c or a value based on the detection result of the X-direction acceleration sensor 21b) and a value showing a deformation amount of the vehicle M (a value based on the detection result of the Y-direction acceleration sensor 21a). Namely, in the case where a determination condition (a first determination condition) concerning the behavior of the vehicle M and a determination condition (a second determination condition) concerning the deformation amount of the vehicle M are met together, the collision determination section 12 of the present embodiment determines that the collision has occurred to the vehicle M. The term "behavior of the vehicle M" described here indicates, for example, a rotation behavior of the vehicle M caused by a side collision and the like.

Here, the value showing the behavior of the vehicle M is, for example, a physical amount obtained from the detection result of the yaw rate sensor 28c or the detection result of the X-direction acceleration sensor 21b. For example, the value showing the behavior of the vehicle M may be the value itself (yaw rate and acceleration value) included in the detection result of the yaw rate sensor 28c or the detection result of the X-direction acceleration sensor 21b or it may be a value (a difference value) obtained by taking a difference per a predetermined time (unit time) from the value included in the detection result of the yaw rate sensor 28c or the detection result of the X-direction acceleration sensor 21b or it may also be a value (an integration value) obtained by integrating (e.g. primary integration or secondary integration) the value included in the detection result of the yaw rate sensor 28c or the detection result of the X-direction acceleration sensor 21b for a predetermined time (unit time). Further, the value showing the behavior of the vehicle M, for example, may also be the difference value, etc. of the detection result of the X-direction acceleration sensor 21b of the first side sensor 21 and the detection result of the X-direction acceleration sensor 22b of the second side sensor 22 per a predetermined time (unit time).

Further, the value showing a rotation behavior of the vehicle M is, for example, a physical amount obtained from the detection result of the yaw rate sensor 28c or the detection result of the X-direction acceleration sensor 21b in a condition in which it is or it was determined that deformation has been caused in the vehicle M (for example, in the case where values based on the detection results of the Y-direction acceleration sensor 21a and the Y-direction acceleration sensor 28a exceed a threshold value). Still further, the value showing the rotation behavior of the vehicle M may also be, for example, a physical amount obtained from the detection result of the yaw rate sensor 28c or the detection result of the X-direction acceleration sensor 21b in the case where an opposite acceleration is detected in the X-direction acceleration sensor 21b of the first side sensor 21 and the X-direction acceleration sensor 22b of the second side sensor 22. As a specific example, a physical amount obtained from the detection result of the yaw rate sensor 28c or the detection result of the X-direction acceleration sensor 21b in the case where a collision has occurred to a place apart from a vehicle gravity center G on the first side S1, an acceleration to a vehicle rear is detected in the X-direction acceleration sensor 21b of the first side sensor 21 and an acceleration to a vehicle front is detected in the X-direction acceleration sensor 22b of the second side sensor 22 corresponds to one example of the value showing the rotation behavior of the vehicle M. Also, for example, in the case where a large physical amount which cannot be obtained in normal travelling of the vehicle M as the physical amount obtained from the detection result of the yaw rate sensor 28c or the detection result of the X-direction acceleration sensor 21b is obtained, the value showing the rotation behavior of the vehicle M may also be those physical amounts. In this case, the term "the value showing the rotation behavior of the vehicle M" may be replaced with "the value concerning the rotation behavior of the vehicle M".

Likewise, a value showing a deformation amount of the vehicle M is, for example, a physical amount obtained from the detection result of the Y-direction acceleration sensor 21a. For example, the value showing the deformation amount of the vehicle M may be a value itself (the acceleration value) included in the detection result of the Y-direction acceleration sensor 21a, may be the value (the difference value) obtained from the value included in the detection result of the Y-direction acceleration sensor 21a by taking a difference per a predetermined time (unit time), or may also be the value (the integration value) obtained by integrating (e.g. the primary integration or secondary integration) the value included in the detection result of the Y-direction acceleration sensor 21a for a predetermined time (unit time). Further, the value showing the deformation amount of the vehicle M, for example, may be the difference value of the detection result of the Y-direction acceleration sensor 21a of the first side sensor 21 and the detection result of the Y-direction acceleration sensor 22a of the second side sensor 22 per a predetermined time (unit time).

In other words, the terra "the value based on the detection result of the sensor" described in this application may also be the value itself included in the detection result of the sensor, or may also be the value derived by performing an arithmetic operation or a process for the detection result of the sensor. Further, the term "the value obtained from the detection result of the sensor" is used in the same meaning as "the value based on the detection result of the sensor".

In the present embodiment, the collision determination section 12, as a determination concerning the first determination condition, determines whether or not the value based on the detection result of the yaw rate sensor 28c exceeds the first threshold value and whether or not the value based on the detection result of the X-direction acceleration sensor 21b exceeds the second threshold value. And, the collision determination section 12 determines that the determination condition (the first determination condition) concerning the behavior of the vehicle M was met in the case where the value based on the detection result of the yaw rate sensor 28c exceeds the first threshold value or in the case where the value based on the detection result of the X-direction acceleration sensor 21b exceeds the second threshold value.

Further, the collision determination section 12, as a determination concerning the second determination condition, determines whether or not the value based on the detection result of the Y-direction acceleration sensor 21a exceeds a third threshold value. And, the collision determination section 12 determines that the determination condition (the second determination condition) concerning the deformation amount of the vehicle M was met in the case where the value based on the detection result of the Y-direction acceleration sensor 21a exceeds the third threshold value.

And, the collision determination section 12 determines that the collision has occurred to the vehicle M in the case where both the first determination condition and the second determination condition were met. In other words, the collision determination section 12 determines whether or not the collision has occurred to the vehicle M based on the detection result of the yaw rate sensor 28c and the detection result of the Y-direction acceleration sensor 21a and determines whether or not the collision has occurred to the vehicle M also based on the detection result of the X-direction acceleration sensor 21b and the detection result of the Y-direction acceleration sensor 21a. In the present embodiment, the collision determination section 12 determines that the collision has occurred to the vehicle M in the case where the value based on the detection result of the yaw rate sensor 28c exceeds the first threshold value and the value based on the detection result of the Y-direction acceleration sensor 21a exceeds the third threshold value and determines that the collision has occurred to the vehicle M even in the case where the value based on the detection result of the X-direction acceleration sensor 21b exceeds the second threshold value and the value based on the detection result of the Y-direction acceleration sensor 21a exceeds the third threshold value.

Meanwhile, the timing when the value based on the detection result of the yaw rate sensor 28c exceeds the first threshold value and the timing when the value based on the detection result of the Y-direction acceleration sensor 21a exceeds the third threshold value are not limited to almost at the same time and there may a little time lag therebetween. Also, the timing when the value based on the detection result of the X-direction acceleration sensor 21b exceeds the second threshold value and the timing when the value based on the detection result of the Y-direction acceleration sensor 21a exceeds the third threshold value are not limited to almost at the same time and there may be a little time lag therebetween.

Here, the collision determination section 12 of the present embodiment, for a low speed collision, determines whether or not the collision has occurred to the vehicle M based on the detection result of the yaw rate sensor 28c and the detection result of the Y-direction acceleration sensor 21a. On the other hand, the collision determination section 12, for a high speed collision, determines whether or not the collision has occurred to the vehicle M based on the detection result of the X-direction acceleration sensor 21b and the detection result of the Y-direction acceleration sensor 21a. The high speed collision is a collision with a speed faster than that of the low speed collision.

To realize this, in the present embodiment, the first threshold value is set in such a manner that, in the case where the collision at the first speed which is a low speed has occurred to the vehicle M, the value based on the detection result of the yaw rate sensor 28c exceeds the first threshold value. On the other hand, the second threshold value is set in such a manner that, in the case where the collision at the first speed which is a low speed has occurred to the vehicle M, the value based on the detection result of the X-direction acceleration sensor 21b does not exceed the second threshold value, and in the case where the collision at the second speed which is faster than the first speed has occurred to the vehicle M, the value based on the detection result of the X-direction acceleration sensor 21b exceeds the second threshold value. In this manner, the collision determination section 12 of the present embodiment can select the sensor to be used in the collision determination depending on the low speed collision or the high speed collision. The term "low speed" described here, for example, in a pole collision mode which is now used for assessment of a side collision of J-NCAP (Japan New Car Assessment Program), indicates a speed in which the collision speed is, for example, less than 20 km/h in the case where a collision position between the pole and the vehicle is changed to a rear seat, while the term "high speed" indicates, a speed in which the collision speed is, for example, 20 km/h or more. However, the definitions of "low speed" and "high speed" are not limited to the above-mentioned examples, but an optional speed can be set as appropriate. Also, the term "low speed" may be replaced with "a low or medium speed".

Further, as shown in FIG. 3, the collision determination section 12 of the present embodiment determines whether or not the collision has occurred to the vehicle M based on the detection result of the cabin inner sensor 28 as well as the detection result of the yaw rate sensor 28c, the detection result of the X-direction acceleration sensor 21b, and the detection result of the Y-direction acceleration sensor 21a. For example, the collision determination section 12 determines that the collision has occurred to the vehicle M in the case where both the first determination condition and the second determination condition are met and a value based on the detection result of the cabin inner sensor 28 (the value based on the acceleration detected by the cabin inner sensor 28 or the value based on the yaw rate) exceeds a predetermined threshold value. The cabin inner sensor 28 mainly detects a motion of the entire vehicle.

Here, the determination concerning the behaviors of the vehicle M (the determination based on the detection result of the X-direction acceleration sensor 21b or the detection result of the yaw rate sensor 28c) and the determination concerning the deformation amount of the vehicle M (the determination based on the detection result of the Y-direction acceleration sensor 21a) can be performed separately from each other or can be performed almost at the same time as one determination. In the present embodiment, the determination concerning the behaviors of the vehicle M and the determination concerning the deformation amount of the vehicle M are performed almost at the same time by using a virtual map.

Figure 4:
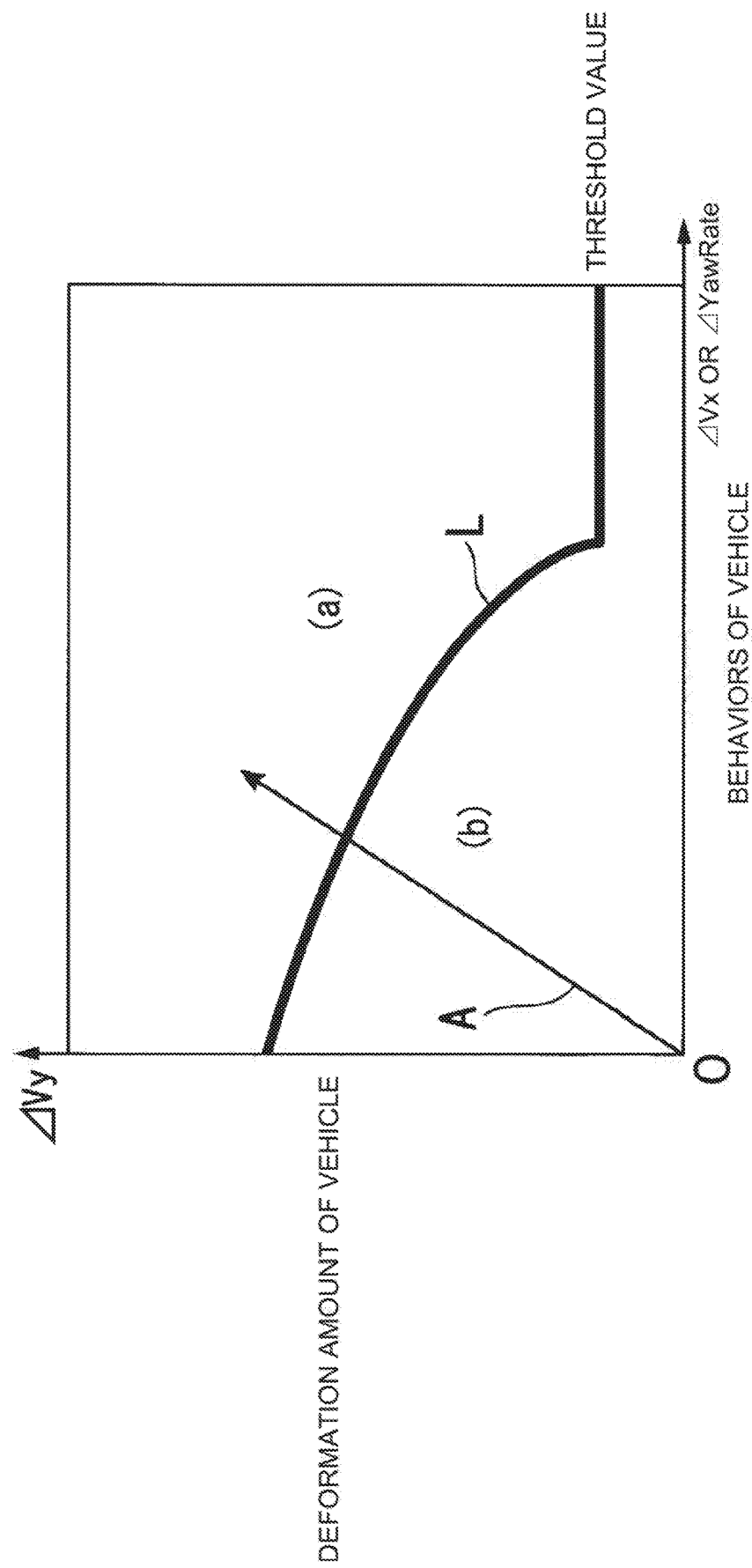
FIG. 4 is a view showing a virtual map used in the collision determination of the present embodiment.

FIG. 4 is a view showing a virtual map which is used in a collision determination of the present embodiment.

The vertical axis of the figure shows a deformation amount of the vehicle M and corresponds to a value ($\Delta$Vy) based on the detection result of the Y-direction acceleration sensor 21a. The horizontal axis of the figure shows a size of the behavior of the vehicle M and corresponds to a value ($\Delta$Vx) based on the detection result of the X-direction acceleration sensor 21b or a value ($\Delta$YawRate) based on the detection result of the yaw rate sensor 28c. Namely, the horizontal axis of the figure, in the case where the collision determination is performed based on the detection result of the X-direction acceleration sensor 21b (e.g., a case of high speed collision), corresponds to a value based on the detection result of the X-direction acceleration sensor 21b. On the other hand, the horizontal axis of the figure, in the case where the collision determination is performed based on the detection result of the yaw rate sensor 28c (e.g., a case of low speed collision), corresponds to a value based on the detection result of the yaw rate sensor 28c. A vector A of the figure shows a combination of a value showing the size of behaviors of the vehicle M (the value based on the detection result of the X-direction acceleration sensor 21b or the value based on the yaw rate sensor 28c) and a value showing the deformation amount of the vehicle M (the value based on the detection result of the Y-direction acceleration sensor 21a). A virtual line L shown on the map is a group of threshold values which are used in the collision determination. That is, each point on the line L of the FIG. is a group of (the first threshold value, the third threshold value) or of (the second threshold value, the third threshold value) as (abscissa, ordinate). In other words, "the first threshold value", "the second threshold value", and "the third threshold value" as described in this application are not limited to one value respectively, but may be various values which are set in the combination of "the first threshold value", "the second threshold value", and "the third threshold value".

In the case where a combination (i.e., points shown by the end point of vector A) of the value showing the size of behaviors of the vehicle M and the value showing the deformation amount of the vehicle M is larger than the line L on the map (is situated in the area (a) of FIG. 4), the collision determination section 12 determines that both the first determination condition and the second determination condition are met and the collision has occurred to the vehicle M. On the other hand, in the case where a combination of the value showing the size of behaviors of the vehicle M and the value showing the deformation amount of the vehicle M is smaller than the line L on the map (is located in an area (b) of FIG. 4), the collision determination section 12 determines that at least one of the first determination condition and the second determination condition is not met and the collision has not occurred to the vehicle M.

Next, a determination of the severity of collision by the collision determination section 12 will be described.

The term "the severity of collision" described here is an index based on at least one of a collision position in the vehicle M and a collision speed to the vehicle M. That is, in the vehicle M, the closer to a seat collision position, the larger the severity of collision. On the other hand, the farther from the seat the collision position, the smaller the severity of collision. Also, the larger the collision speed to the vehicle M, the larger the severity of collision. Meanwhile, the smaller the collision speed to the vehicle M, the smaller the severity of collision.

Figure 5:
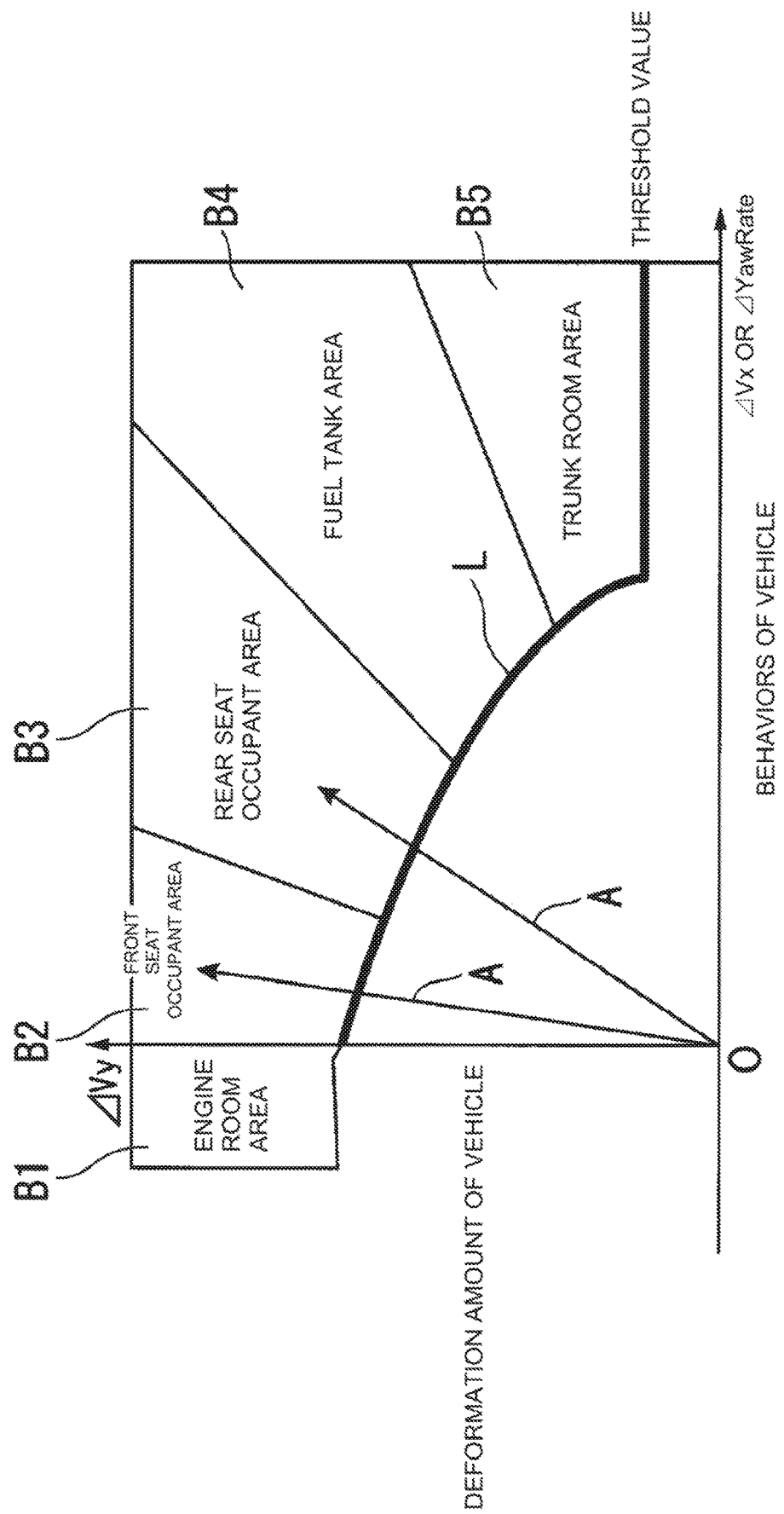
FIG. 5 is a view explaining the determination of a collision position of the present embodiment.

FIG. 5 is a view explaining the determination of a collision position in the vehicle M.

As shown in FIG. 5, in the present embodiment, a plurality of areas concerning the collision position is set on the map in response to various combinations (i.e., the directions of various vectors A) of a value showing the size of behaviors of the vehicle M and a value showing the deformation amount of the vehicle M. The plurality of areas includes, for example, an engine room area B1, a front seat occupant area B2, a rear seat occupant area B3, a fuel tank area B4, a trunk room area B5 and the like.

And, the collision determination section 12 determines the collision position in the vehicle M based on a combination of the value showing the size of behaviors of the vehicle M (value based on the detection result of the X-direction acceleration sensor 21b or the value based on the detection result of the yaw rate sensor 28c) and the value showing the deformation amount of the vehicle M (value based on the detection result of the Y-direction acceleration sensor 21a). Namely, the collision determination section 12 determines the collision position in the vehicle M by the direction (inclination) of the vector A on the map shown by the combination of the value showing the size of behaviors of the vehicle M and the value showing the deformation amount of the vehicle M. For example, in the case where the combination (the end point of the vector A) of the value showing the size of behaviors of the vehicle M and the value showing the deformation amount of the vehicle M is located in the front seat occupant area B2 on the map, the collision determination section 12 determines that the collision has occurred near a front seat in the vehicle M. Likewise, in the case where the combination of the value showing the size of behaviors of the vehicle M and the value showing the deformation amount of the vehicle M is located in the rear seat occupant area B3 on the map, the collision determination section 12 determines that the collision has occurred near the rear seat in the vehicle M. The collision determination section 12 transmits the determination result of the collision position in the vehicle M to the airbag control section 13 and the information transmission section 14.

Figure 6:
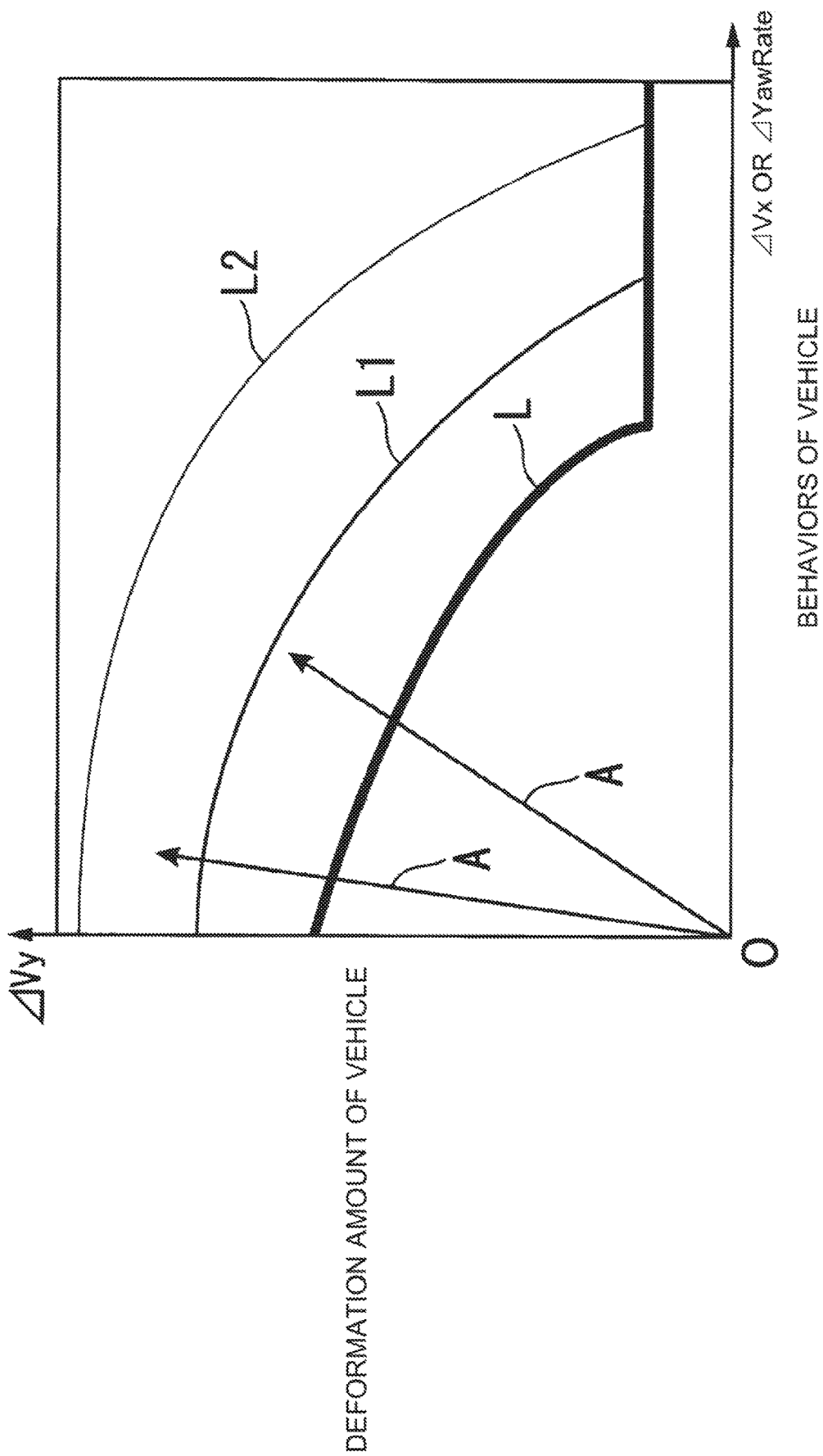
FIG. 6 is a view explaining the determination of a collision speed of the present embodiment.

FIG. 6 is a view explaining the determination of a collision speed in the vehicle M.

As shown in FIG. 6, in the present embodiment, a plurality of virtual lines L1, L2 (a group of the threshold values) corresponding to some collision speeds is set on the map. In the present embodiment, the lines L1, L2 correspond to mutually different collision speeds. The threshold values on each line L1, L2 are the combination of the value (value on the horizontal axis) for matching the size of behaviors and the collision speed of the vehicle M and the value (value on the vertical axis) for matching the deformation amount and the collision speed of the vehicle M. For example, the line L1 is a line corresponding to the collision speed of a speed $V_1$. The line 2 is a line corresponding to the collision speed of a speed $V_2$ which is faster than $V_1$.

And, the collision determination section 12 determines the collision speed to the vehicle M based on the combination of the value showing the size of behaviors of the vehicle M (the value based on the detection result of the X-direction acceleration sensor 21b and the value based on the detection result of the yaw rate sensor 28c) and the value showing the deformation amount of the vehicle M (the value based on the detection result of the Y-direction acceleration sensor 21a). For example, in the case where the combination (the end point of vector A) of the value showing the size of behaviors of the vehicle M and the value showing the deformation amount of the vehicle M is larger than the line L1 and lower than the line 2 on the map, the collision determination section 12 determines that the collision at a speed which is a speed $V_1$ or more and less than a speed $V_2$ has occurred to the vehicle M. Likewise, in the case where the combination of the value showing the size of behaviors of the vehicle M and the value showing the deformation amount of the vehicle M is larger than the line L2, the collision determination section 12 determines that the collision at a speed faster than the speed $V_2$ has occurred. The collision determination section 12 transmits the determination result of the collision speed to the vehicle M to the airbag control section 13 and the information transmission section 14.

Next, the process flow of the control unit 10 of the present embodiment will foe described below.

Figure 7:
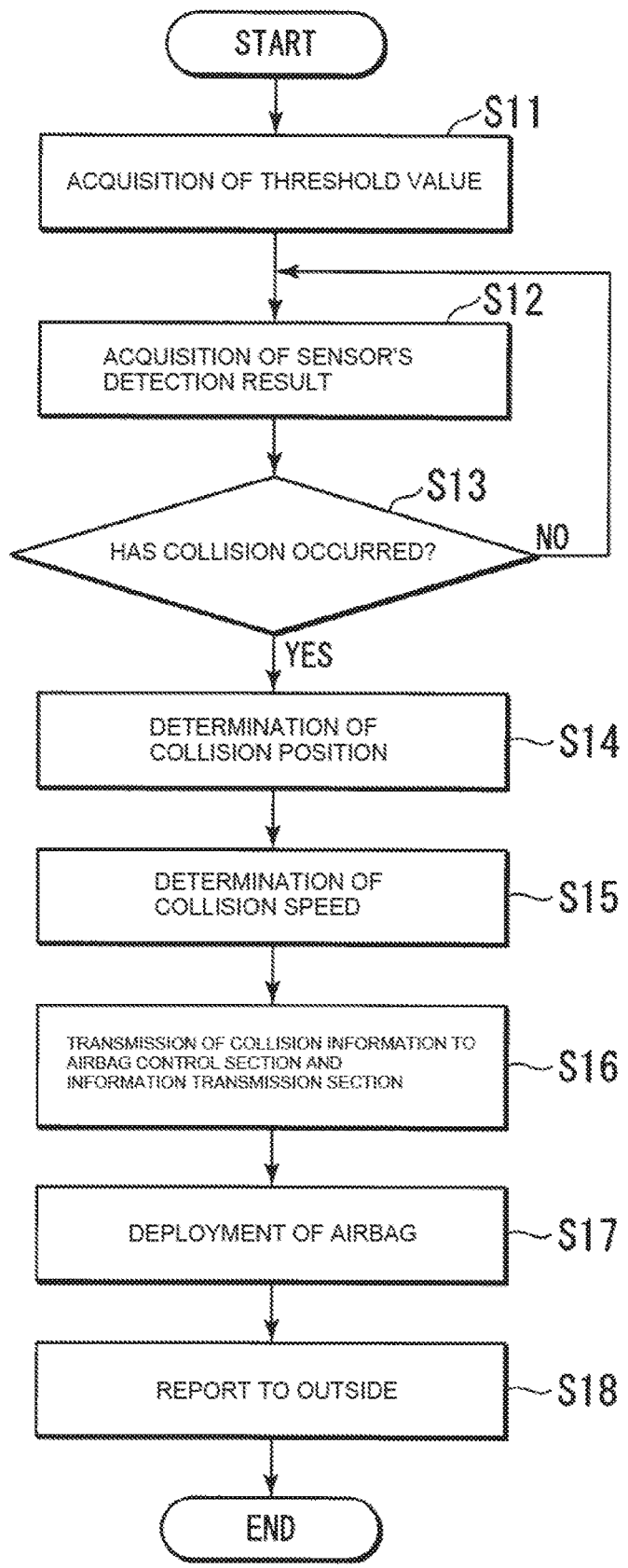
FIG. 7 is a flowchart showing the flow of processing of a control unit of the present embodiment.

FIG. 7 is a flow chart showing a process flow of the control unit 10 of the present embodiment.

First, the collision determination section 12 accesses the memory section 11 to acquire each threshold value (information on the map) stored in the memory section 11 (step S11). Also, the collision determination section 12 obtains respective detection results from the Y-direction acceleration sensors 21a, 22a, the X-direction acceleration sensors 21b, 22b, and the yaw rate sensor 28c (step S12).

And, the collision determination section 12 determines whether or not the collision has occurred to the vehicle M based on the value showing the behaviors of the vehicle M (the value based on the detection result of the X-direction acceleration sensor 21b or the value based on the detection result of the yaw rate sensor 28c) and the value showing the deformation amount of the vehicle M (the value based on the detection result of the Y-direction acceleration sensor 21a) (step s13). That is, in the case where at least a determination condition (a first determination condition) concerning the behaviors of the vehicle M and a determination condition (a second determination condition) concerning the deformation amount of the vehicle M are met together, the collision determination section 12 determines that the collision has occurred to the vehicle M. On the other hand, in the case where any one of the determination condition (the first determination condition) concerning the behaviors of the vehicle M and the determination condition (the second determination condition) concerning the deformation amount of the vehicle M is not met, the collision determination section 12 determines that the collision has not occurred to the vehicle M. In this case, the collision determination section 12 returns to a process before step S12 and repeats the processes of step S12 and step S13 until a predetermined condition (e.g., the stop of an engine) is met.

On the other hand, in the case where the collision determination section 12 determines that the collision has occurred to the vehicle M, the collision determination section determines a collision position in the vehicle M and a collision speed to the vehicle M. Specifically, the collision determination section 12 determines the collision position in the vehicle M based on the value showing the size of behaviors of the vehicle M and the value showing the deformation amount of the vehicle M (step S14). Further, the collision determination section 12 determines the collision speed to the vehicle M based on the value showing the size of the behaviors of the vehicle M and the value showing the deformation amount of the vehicle M (step S15). Still further, the collision determination section 12 determines the severity of collision based on the determination result of the collision position in the vehicle M and the determination result of the collision speed to the vehicle M. The severity of collision is shown, for example, by the combination of the collision position in the vehicle M and the collision speed to the vehicle M. And, the collision determination section 12 transmits the determination result of the collision position in the vehicle M, the determination result of the collision speed to the vehicle M, and the determination result of the severity of collision to the airbag control section 13 and the information transmission section 14 (step S16).

The airbag control section 13 selects an airbag to be deployed from among a first side airbag 31 and a second side airbag 32 based on at least one of the determination result of the severity of collision receiving from the collision determination section 12, the determination result of the collision position in the vehicle M, and the determination result of the collision speed to the vehicle M and deploys the selected airbag (step S17).

For example, the airbag control section 13 determines an operation method of the first side airbag 31 and the second side airbag 42 based on the severity of collision (or the collision speed) receiving from the collision determination section 12. Specifically, the airbag control section 13 deploys more airbags in the case where the severity of collision receiving from the collision determination section 12 is large (or the collision speed is large).

Also, the airbag control section 13 determines an operation method of the first side airbag 31 and the second side airbag 32 based on the collision position in the vehicle M receiving from the collision determination section 12. Specifically, the airbag control section 13 deploys an airbag corresponding to the collision position in the vehicle M from among a plurality of airbags (e.g., the side airbags 31$a$, 31$b$, 32$a$, and 32$b$) included in the first side airbag 31 and the second side airbag 32.

The information transmission section 14 generates information to be transmitted as an emergency call to the outside of the vehicle M based on the determination result of the severity of collision receiving from the collision determination section 12, the determination result of the collision position in the vehicle M, and the determination result of collision speed to the vehicle M and transmits the information (step S18). The information to be transmitted as the emergency call includes, for example, at least one of the determination result of the severity of collision, the determination result of collision position in the vehicle M, and the determination result of collision speed to the vehicle M. In this manner, it is possible to transmit the information useful for an emergency life-saving activity.

According to the occupant protection device 1 with such a structure, the occupants can be protected at a higher level. Here, the acceleration sensor has a highly prompt reporting feature for detecting an impact transmitting to a skeleton structure of a vehicle body, but it is easy to pick up noise. On the other hand, the sensor (e.g., the yaw rate sensor) for detecting a value concerning the rotation angle of the vehicle M is stable and has high reliability because it detects the behaviors of the entire vehicle, but it may be inferior in terms of the prompt reporting feature.

For this reason, the collision determination section 12 of the present embodiment uses both the detection result of the yaw rate sensor 28$c$ and the detection result of the X-direction acceleration sensor 21$b$ in the detection of vehicle behaviors. It is therefore possible to stably determine the collision based on the detection result of the yaw rate sensor 28$c$ for a low speed collision. On the other hand, for a high speed collision in which the prompt reporting feature is valued, it is possible to promptly determine the collision by the X-direction acceleration sensor 21$b$. With this, it is possible to balance the prompt reporting feature and stability of the collision determination without depending on an energy amount (speed, mass) of an object colliding with the vehicle M at a higher level. As a result, the occupants can be protected at a higher level.

In the present embodiment, since the X-direction acceleration sensor 21$b$ is provided on the side of the vehicle M, for example, as compared to the case where the X-direction acceleration sensor 21$b$ is provided near the gravity center of the vehicle M, it is easy to detect the behaviors of the vehicle by the X-direction acceleration sensor 21$b$. With this, the accuracy of collision determination can be improved. For example, the X-direction acceleration sensor 21$b$ is located apart from the lower end (base section) Pe of the front pillar and the cabin inner sensor 28 relative to the gravity center G of the vehicle M. According to such an X-direction acceleration sensor 21$b$, the vehicle behaviors can be detected more easily.

In the present embodiment, the collision determination section 12 determines whether or not the collision has occurred to the vehicle M based on the detection result of the yaw rate sensor 28$c$ and the detection result of the Y-direction acceleration sensor 21$a$ and determines whether or not the collision has occurred to the vehicle M also based on the detection result of the X-direction acceleration sensor 21$b$ and the detection result of the Y-direction acceleration sensor 21$a$. Namely, the collision determination section 12 performs the collision determination by two indexes of the behaviors of the vehicle M (the detection result of the yaw rate sensor 23$c$ or the detection result of the X-direction acceleration sensor 21$b$) and the deformation amount of the vehicle M (the detection result of the Y-direction acceleration sensor 21$a$). In this manner, the accuracy of collision determination can be further improved.

In the present embodiment, an operation method of the occupant protection member such as an airbag is determined based on the value showing the behaviors of the vehicle M (the value based on the detection result of the X-direction acceleration sensor 21$b$ or the value based on the detection result of the yaw rate sensor 28$c$) and the value showing the deformation amount of the vehicle M (the value based on the detection result of the Y-direction acceleration sensor 21$a$). In this way, the occupant protection member can be operated more effectively. It is to be noted that the collision determination section 12, without directly determining the severity of the collision, may determine the operation method of the occupant protection device based on the value showing the behaviors of the vehicle M (the value based on the detection result of the X-direction acceleration sensor 21$b$ or the value based on detection result of the yaw rate sensor 28$c$) and the value showing the deformation amount of the vehicle M (the value based on the detection result of the Y-direction acceleration sensor 21$a$).

In the present embodiment, the virtual map by the deformation amount of the vehicle M and the behaviors of the vehicle M is used and in the case where the collision was determined, the operation method of the occupant protection member such as the airbag is determined based on the area belonging on the map. With this, the severity of collision corresponding to, for example, the collision position and collision speed is roughly specified and the control of the occupant protection device 1 corresponding to the specified severity becomes possible. In this manner, occupants can be protected at a higher level.

Here, in the case where a side collision has occurred to the vehicle M, since the collided vehicle M rotates, there was a case in which it was difficult to determine the severity of collision only based on the detection result of, for example, the Y-direction acceleration sensor 21*a*.

To cope with such a situation, in the present embodiment, the collision determination section 12 determines the severity of collision generated in the vehicle M based on the combination of the value showing the behaviors of the vehicle M (the value based on the detection result of the X-direction acceleration sensor 21*b* or the value based on the detection result of the yaw rate sensor 28*c*) and the value showing the deformation amount of the vehicle M (the value based on the detection result of the Y-direction acceleration sensor 21*a*). That is, by paying attention to the behaviors of the vehicle M as well as the deformation amount of the vehicle M, even though the side collision receiving vehicle M rotates, the severity of collision can be determined with comparatively high accuracy. Therefore, more effective operation of the occupant protection member (deployment of the airbag corresponding to the severity of collision), the emergency call including the severity of collision and the like become possible. With this, the occupants and their surroundings can be protected at a higher level.

Further, in the case where the side collision has occurred to the vehicle M, for example, there was a case in which it was difficult to determine whether the collision at a low speed has occurred near the sensor or whether the collision at a high speed has occurred apart from the sensor, only by the detection result of the Y-direction acceleration sensor 21*a*.

Thus, in the present embodiment, the collision determination section 12 determines the collision position in the vehicle M based on the combination of the value showing the behaviors of the vehicle M (the value based on the detection result of the X-direction acceleration sensor 21*b* or the detection result of the yaw rate sensor 28*c*) and the value showing the deformation amount of the vehicle M (the value based on the detection result of the Y-direction acceleration sensor 21*a*). Namely, by paying attention to the behaviors of the vehicle M as well the deformation amount of the vehicle M, the collision position in the vehicle M can be determined with comparatively high accuracy. Further, by paying attention to the behaviors of the vehicle M as well as the deformation amount of the vehicle M, it is possible not only to determine whether or not the collision at a low speed has occurred near the sensor or whether or not the collision at a high speed has occurred apart from the sensor, but also to determine the collision position in a comparatively wide area (the collision in a position comparatively distant from the sensor can also be detected). Therefore, more effective operation of the occupant protection member (deployment of the airbag corresponding to the collision position), the emergency call including the collision position and the like become possible. In this manner, the occupants and their surroundings can be protected at a higher level.

Further, in the present embodiment, the collision determination section 12 determines the collision speed to the vehicle M based on the combination of the value showing the behaviors of the vehicle M (the value based on the detection result of the X-direction acceleration sensor 21*b* or the value based on the detection result of the yaw rate sensor 28*c*) and the value showing the deformation amount of the vehicle M (the value based on the detection result of the Y-direction acceleration sensor 21*a*). That is, by paying attention to the behaviors of the vehicle M as well as the deformation amount of the vehicle M, the collision speed to the vehicle M can be determined with comparatively high accuracy. Therefore, more effective operation of the occupant protection member (deployment of the airbag corresponding to the collision speed), an emergency call including the collision speed and the like become possible. As a result, the occupants and their surroundings can be protected at a higher level.

All or part of each function section of the control unit 10 as described in the above-mentioned embodiments can be realized by executing the programs (software) stored, for example, in a memory or the like by a processor (a hard processor). Also, all or part of this function section may be realized by the hardware such as LSI (Large Scale Integration) and ASIC (Application Specific Integrated Circuit) or may also be realized by the combination of the software and the hardware.

Embodiments were described above, but the structures of the embodiments are not limited to above examples. For example, the collision determination section 12, in the case where the side collision has occurred to the vehicle M, may determine whether or not the collision has occurred based on both of the detection result of the sensor on the collision side (e.g., the first side sensor 21) and the detection result of the sensor on the non-collision side (e.g., the second side sensor 22) (So-called multipoint determination may also be performed). Even in this case, the collision determination section 12, for example, may also determine whether or not the collision has occurred to the vehicle M based on the value showing the behaviors of the vehicle M and the value showing the deformation amount of the vehicle M with respect to each of the first side sensor 21 and the second side sensor 22.

Further, in the embodiments stated above, in the case where both of the first determination condition and the second determination condition are met and the value based on the detection result of the cabin inner sensor 28 (the value based on the acceleration detected by the cabin inner sensor 28 or the value based on the yaw rate) exceeds a predetermined threshold value, the collision determination section 12 determines that the collision has occurred to the vehicle M. Instead of this, the collision determination section 12, for example, regardless of the detection result of the cabin inner sensor 28, may determine that the collision has occurred to the vehicle M in the case where both of the first determination condition and the second determination condition are met.

Still further, in the above embodiments, the collision determination section 12 performs the collision determination based on both of the value showing the behaviors of the vehicle M (the value based on the detection result of the X-direction acceleration sensor 21*b* or the value based on the detection result of the yaw rate sensor 28*c*) and the value showing the deformation amount of the vehicle M (the value based on the detection result of the Y-direction acceleration sensor 21*a*). Instead of this, the collision determination section 12 may perform the collision determination based only on the value showing the behaviors of the vehicle M (the value based on the detection result of the X-direction acceleration sensor 21*b* or the value based on the detection result of the yaw rate sensor 28*c*).

For example, the "first sensor" is not limited to the yaw rate sensor 28*c* of the cabin inner sensor 28, but it may be a sensor disposed outside the cabin C. The "second sensor" is not limited to the X-direction acceleration sensor 21*b* of the first side sensor 21 and the X-direction acceleration sensor 22*b* of the second side sensor 22, but it may also be the X-direction acceleration sensor 28*b* of the cabin inner sensor 28 or an X-direction acceleration sensor disposed in a separate place. However, if the X-direction acceleration sensor 21b of the first, side sensor 21 or the X-direction acceleration sensor 22b of the second side sensor 22 is used as the "second sensor", the value showing the behaviors of the vehicle M can be detected with higher accuracy. The "third sensor" is not limited to the Y-direction acceleration sensor 21a of the first side sensor 21 and the Y-direction acceleration sensor 22a of the second side sensor 22, but, for example, it may also be the Y-direction acceleration sensor 28a of the cabin inner sensor 28 or a Y-direction acceleration sensor disposed in a separate place. However, if the Y-direction acceleration sensor 21a of the first, side sensor 21 or the Y-direction acceleration sensor 22a of the second side sensor 22 is used as the "first sensor", the side collision can be detected with higher accuracy.

The exemplary embodiments have been described, but the invention is not limited to these embodiments at all and various modifications, variations and alternatives should be possible within the scope of the present invention. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. An occupant protection device comprising:
a first sensor for detecting a value concerning a rotation angle of a vehicle;
a second sensor provided on a side of the vehicle to detect an acceleration in a vehicle longitudinal direction; and
a collision determination controller configured to determine whether or not a collision has occurred to the vehicle based on detection result of the first sensor, the collision determination controller also determining whether or not the collision has occurred to the vehicle based on detection result of the second sensor,
wherein the value concerning the rotation angle of the vehicle includes a yaw rate of the vehicle, and
wherein the collision determination controller determines whether or not the collision has occurred to the vehicle based on the detection result of the first sensor for a collision at a first speed, and also determines whether or not the collision has occurred to the vehicle based on the detection result of the second sensor for a collision at a second speed faster than the first speed.

2. The occupant protection device according to claim 1, wherein the collision determination controller determines whether or not the collision has occurred to the vehicle based on a value showing a rotation behavior of the vehicle obtained from the detection result of the first sensor, and also determines whether or not the collision has occurred to the vehicle based on a value showing a rotation behavior of the vehicle obtained from the detection result of the second sensor.

3. The occupant protection device according to claim 1, wherein
the collision determination controller determines that the collision has occurred to the vehicle in the case where the value based on the detection result of the first sensor exceeds a first threshold value, and also determines that the collision has occurred to the vehicle in the case where a value based on the detection result of the second sensor exceeds a second threshold value, and
wherein
the first threshold value is provided in such a manner that, in the case where the collision at a first speed has occurred to the vehicle, the value based on the detection result of the first sensor exceeds the first threshold value, and
the second threshold value is provided in such a manner that, in the case where the collision at the first speed has occurred to the vehicle, the value based on the detection result of the second sensor does not exceed the second threshold value and, and in the case where the collision at the second speed faster than the first speed has occurred to the vehicle, the value based on the detection result of the second sensor exceeds the second threshold value.

4. The occupant protection device according to claim 1, wherein
the second sensor detects an acceleration in the vehicle width direction, and
the collision determination controller determines whether or not the collision has occurred to the vehicle based on the detection result of the first sensor and on detection result concerning the acceleration of the second sensor in the vehicle width direction, and also determines whether or not the collision has occurred to the vehicle based on the detection result concerning the acceleration of the second sensor in the vehicle longitudinal direction and on the detection result concerning the acceleration of the second sensor in the vehicle width direction.

5. The occupant protection device according to claim 1, further comprising
a third sensor for detecting the acceleration in the vehicle width direction, wherein
the collision determination controller determines whether or not the collision has occurred to the vehicle based on the detection result of the first sensor and detection result of the third sensor, and also determines whether or not the collision has occurred to the vehicle based on the detection result of the second sensor and the detection result of the third sensor.

6. The occupant protection device according to claim 4, wherein the collision determination controller determines that the collision has occurred to the vehicle in the case where the value based on the detection result of the first sensor exceeds the first threshold value and the value based on the detection result of the second sensor concerning the acceleration in the vehicle width direction exceeds the third threshold value, and also determines that the collision has occurred to the vehicle even in the case where the value based on the detection result concerning the acceleration of the second sensor in the vehicle longitudinal direction exceeds the second threshold value and the value based on the detection result of the second sensor concerning the acceleration in the vehicle width direction exceeds the third threshold value.

7. The occupant protection device according to claim 4, further comprising a protection member controller configured to determine an operation method of an occupant protection member based on one of the detection result of the first sensor and the detection result concerning the acceleration of the second sensor in the vehicle longitudinal direction, and the detection result of the second sensor concerning the acceleration in the vehicle width direction.

8. The occupant protection device according to claim 4, wherein the collision determination controller determines a collision position in the vehicle based on one of the detection result of the first sensor and the detection result concerning the acceleration of the second sensor in the vehicle longitudinal direction, and the detection result of the second sensor concerning the acceleration in the vehicle width direction.

9. The occupant protection device according to claim 4, wherein the collision determination controller determines a collision speed with respect to the vehicle based on one of the detection result of the first sensor and the detection result concerning the acceleration of the second sensor in the vehicle longitudinal direction, and the detection result of the second sensor concerning the acceleration in the vehicle width direction.

10. The occupant protection device according to claim 1, wherein the collision determination controller does not determines whether or not the collision has occurred to the vehicle based on the detection result of the second sensor for the collision at the first speed.

11. An occupant protection device comprising:
a first sensor for detecting a value concerning a rotation angle of a vehicle;
a second sensor provided on a side of the vehicle to detect an acceleration in a vehicle longitudinal direction; and
a collision determination circuitry configured to determine whether or not a collision has occurred to the vehicle based on detection result of the first sensor, the collision determination circuitry also determining whether or not the collision has occurred to the vehicle based on detection result of the second sensor,
wherein the value concerning the rotation angle of the vehicle includes a yaw rate of the vehicle, and
wherein the collision determination circuitry determines whether or not the collision has occurred to the vehicle based on the detection result of the first sensor for a collision at a first speed, and also determines whether or not the collision has occurred to the vehicle based on the detection result of the second sensor for a collision at a second speed faster than the first speed.

12. An method comprising:
(i) detecting, by using a first sensor, a value concerning a rotation angle of a vehicle;
(ii) detecting, by using a second sensor provided on a side of the vehicle, an acceleration in a vehicle longitudinal direction; and
(iii) determining, by using a computer, whether or not a collision has occurred to the vehicle based on detection result of the first sensor, and also determination, by using the computer, whether or not the collision has occurred to the vehicle based on detection result of the second sensor,
wherein the value concerning the rotation angle of the vehicle includes a yaw rate of the vehicle, and
wherein the step (iii) determines whether or not the collision has occurred to the vehicle based on the detection result of the first sensor for a collision at a first speed, and also determines whether or not the collision has occurred to the vehicle based on the detection result of the second sensor for a collision at a second speed faster than the first speed.

13. The occupant protection device according to claim 11, wherein
the collision determination circuitry determines that the collision has occurred to the vehicle in the case where the value based on the detection result of the first sensor exceeds a first threshold value, and also determines that the collision has occurred to the vehicle in the case where a value based on the detection result of the second sensor exceeds a second threshold value, and wherein
the first threshold value is provided in such a manner that, in the case where the collision at a first speed has occurred to the vehicle, the value based on the detection result of the first sensor exceeds the first threshold value, and
the second threshold value is provided in such a manner that, in the case where the collision at the first speed has occurred to the vehicle, the value based on the detection result of the second sensor does not exceed the second threshold value and, and in the case where the collision at the second speed faster than the first speed has occurred to the vehicle, the value based on the detection result of the second sensor exceeds the second threshold value.

14. The occupant protection device according to claim 11, wherein
the second sensor detects an acceleration in the vehicle width direction, and
the collision determination circuitry determines whether or not the collision has occurred to the vehicle based on the detection result of the first sensor and on detection result concerning the acceleration of the second sensor in the vehicle width direction, and also determines whether or not the collision has occurred to the vehicle based on the detection result concerning the acceleration of the second sensor in the vehicle longitudinal direction and on the detection result concerning the acceleration of the second sensor in the vehicle width direction.

15. The occupant protection device according to claim 11, further comprising
a third sensor for detecting the acceleration in the vehicle width direction, wherein
the collision determination circuitry determines whether or not the collision has occurred to the vehicle based on the detection result of the first sensor and detection result of the third sensor, and also determines whether or not the collision has occurred to the vehicle based on the detection result of the second sensor and the detection result of the third sensor.

16. The method according to claim 12, wherein
the step (iii) determines that the collision has occurred to the vehicle in the case where the value based on the detection result of the first sensor exceeds a first threshold value, and also determines that the collision has occurred to the vehicle in the case where a value based on the detection result of the second sensor exceeds a second threshold value, and wherein
the first threshold value is provided in such a manner that, in the case where the collision at a first speed has occurred to the vehicle, the value based on the detection result of the first sensor exceeds the first threshold value, and
the second threshold value is provided in such a manner that, in the case where the collision at the first speed has occurred to the vehicle, the value based on the detection result of the second sensor does not exceed the second threshold value and, and in the case where the collision at the second speed faster than the first speed has occurred to the vehicle, the value based on the detection result of the second sensor exceeds the second threshold value.

17. The method according to claim 12, wherein
the second sensor detects an acceleration in the vehicle width direction, and
the step (iii) determines whether or not the collision has occurred to the vehicle based on the detection result of the first sensor and on detection result concerning the acceleration of the second sensor in the vehicle width direction, and also determines whether or not the collision has occurred to the vehicle based on the detection result concerning the acceleration of the second sensor in the vehicle longitudinal direction and on the detection result concerning the acceleration of the second sensor in the vehicle width direction.

* * * * *